358-86. XR 3,350,502 SR CROSS REFERENCE SEARCH ROOM

United States Patent Office 3,350,502

Patented Oct. 31, 1967

3,350,502

ELECTRICAL SIGNAL DISTRIBUTING SYSTEMS

Kenneth Alexander Russell, London, England, assignor to British Relay Limited, London, England, a British company Filed Oct. 25, 1963, Ser. No. 318,964
15 Claims. (Cl. 178—6)

This invention relates to systems for distributing electrical signals, such as for example, sound or television signals, with conductive wires and is directed more particularly to means for recording or charging for the use of such signals.

According to one aspect of this invention, in a system for distributing electrical signals over wires from a central station to a plurality of users, any or all of which users may utilise the signals as desired, means are provided for feeding also voltage pulses over said wires, the pulses having a duration and waveform such that the required bandwidth for their transmission is below the lowest frequency required for the other signals to be distributed and each user has metering means which are connected to the signal distribution circuit when said signals are being utilised, which metering means include a capacitor arranged to be charged by said pulses and a recording or metering or pre-payment charging instrument operatively responsive to the pulses received. The metering means may conveniently be operated by the capacitor charging current and may be responsive to the number of pulses received.

In a wired television distribution system or in a wired sound signal distribution system, the signal distribution wires will generally carry audio frequency currents and, in the case of a television system, video frequency or radio frequency currents. In such a system, it is convenient to use voltage pulses of a duration of between one and fifty seconds, the pulses being transmitted within a bandwidth range of 0.01 cycle per second to 10 cycles per second. Such pulses may readily be derived from a direct voltage source by means of a commutator switch and they may be fed into the distribution circuit through a low pass filter, comprising for example series chokes and shunt capacitors, to prevent the pulse generating system affecting the audio and/or television signals.

At each point of utilisation, the pulses may be taken from the circuit through a low pass filter comprising, for example, radio frequency chokes in the two wires of a two-wire circuit to the aforesaid metering means. The capacitor may be connected in series with one of these chokes and in series with an electromagnetic escapement mechanism energised by the charging and discharging current of the capacitor. Preferably this escapement mechanism is arranged to have a relatively high impedance at the frequencies of the required signals for distribution since it is in shunt with the signal utilising device. This mechanism might control a coin fed pre-payment mechanism in a manner similar to that commonly used in electrical pre-payment mechanism in a manner similar to that commonly used in electrical pre-payment meters or it might drive any other type of recording instrument, for example a credit charging metering device for recording the utilisation of the signals.

The arrangement of the present invention is particularly advantageous in that, in addition to operating a metering or pre-payment charging device for each user, it is also possible to provide means at the central station for integrating the current taken by the system for charging or discharging the capacitors in the users' equipment so that the extent of use of any signals may be recorded centrally. So that the charging or discharging current should be a direct measure of the number of users utilising the signals, the capacitors of all the users would be made of equal magnitude and the voltage pulses would be made of constant magnitude.

The distribution network to the signals may have an appreciable leakage current and thus may be considered as comprising a shunt impedance across the capacitors, it is preferred to measure the discharge current from the various capacitors rather than the charge current since this shunt impedance can be effectively short circuited by the current measuring device. This avoids any necessity for measuring and correcting for the leakage current. The discharge current may be measured by a current integrating meter at the central station to record the total discharge current. The current integrating meter may conveniently be of the recording type, for example, arranged to record on paper strip, preferably with a timing device marking the paper so that the utilisation of various different programmes can be determined subsequently. In some cases it may be preferred to use a digital type meter printing onto paper tape.

The distribution network may have a residual capacity. This can be measured when the system is not in use and a suitable correction made if necessary. Preferably the capacitors at the users equipment are made of sufficient magnitude that the charging current required for these capacitors is substantially larger than the charging current required for stray capacities in the network.

In a pre-payment or credit-payment system for charging for the utilisation of audio or television signals it may be desired to charge at different rates for different programmes and this may readily be effected by adjusting the pulse recurrence rate for the various programmes according to the rate of charge required. This may be done by using an adjustable speed drive for the commutator. Preferably the pulse generating means, however, is arranged to provide pulses for the same duration although the pulse recurrence frequency is made adjustable.

The charging pulses for the capacitors may be separate from pricing pulses which operate the metering means. For example, a long duration charging pulse may be employed with a corresponding long discharge period and then a series of short duration pricing pulses in rapid succession may be fed into the system, the pricing pulses having a duration sufficient to operate the metering means but sufficiently short that they do not appreciably affect the means at the central station for determining the usage of the programme.

To ensure constancy of the voltage level of the pulses, a suitable voltage monitoring device may be provided.

In a sound and/or television distribution system, there may be provided a number of separate distribution channels and it may be required only to charge for the use of signals on one of these channels. In this case only the appropriate channel (or channels) would be connected to the capacitor for the metering devices, selector switch means being provided so that, when the user selected a channel which was to be charged, the pulse would then be fed into the capacitor of the recording or metering means.

The invention also includes within its scope a system for distributing television signals over wires wherein subscribers have payment or credit meters and wherein price control signals controlling the effective price rate of subscribers meters are transmitted over said wires at a frequency below the lowest frequency used for the distributed television signals. The price control signals are preferably direct current pulses of a duration between 1 and 50 seconds and they may be distributed over the same feeders as the television vision and sound signals.

The invention furthermore includes within its scope a system for distributing television signals over wires wherein each subscriber has a capacitor which is connected in shunt across the input signal network when the subscriber is utilising input signals and wherein means are provided at a central station for superimposing direct voltage pulses of controlled amplitude on the system to charge said capacitors and wherein, at the central station, means are provided for measuring the total discharge current of the various capacitors.

The following is a description of one embodiment of the invention, reference being made to the accompanying drawings in which.

Figure 1:
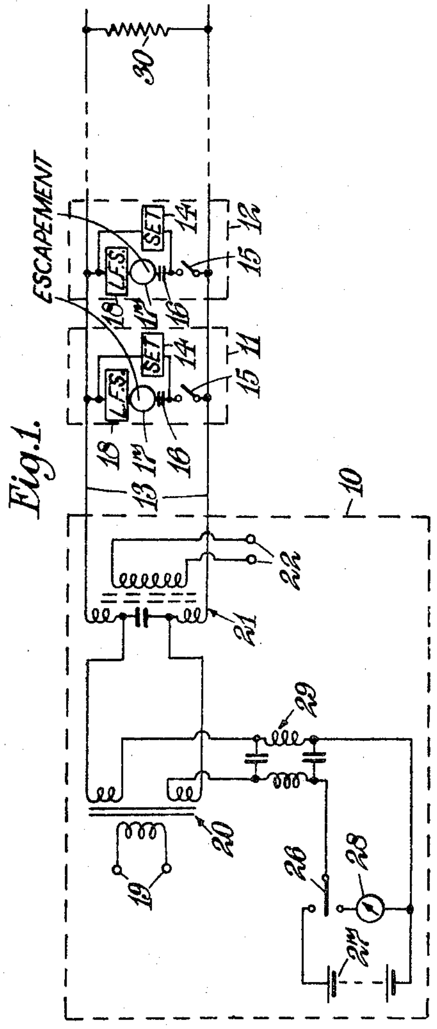
FIGURE 1 is a diagram illustrating the general principle of operation of the system.
Figure 2:
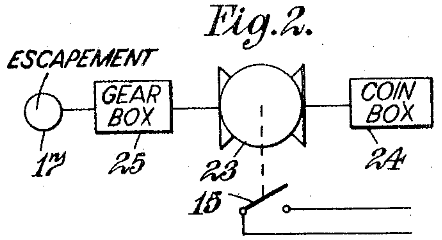
FIGURE 2 is a diagram illustrating part of a charging instrument.
Figures 3, 5:
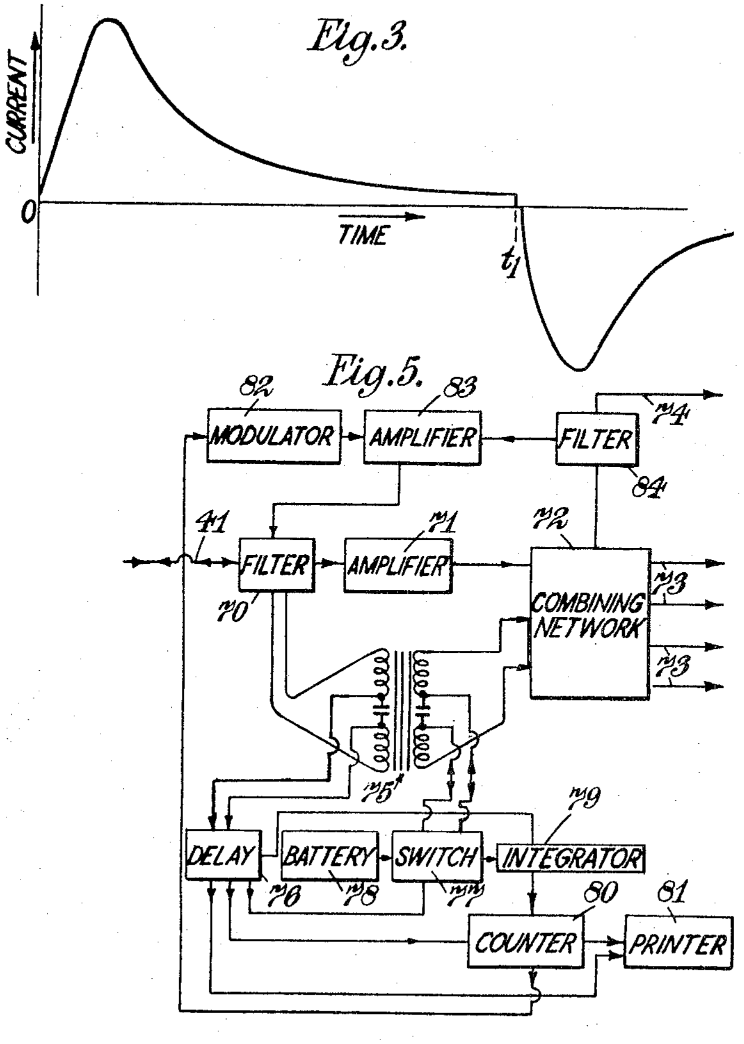
FIGURE 3 is an explanatory graphical diagram.
FIGURE 5 is a block diagram illustrating apparatus at a sub-station.

FIGURE 1 is an explanatory diagram for explaining the general principle of operation of the system of the present invention and shows a central station 10 for feeding picture and sound signals to a number of subscribers of which two subscribers' stations are indicated at 11, 12. The subscribers are connected to the central station by a pair of feeders 13. Each subscriber has reproducing equipment 14 operative when fed with the appropriate sound and vision signals. The signal circuit for the reproducing equipment includes a switch 15. In series with the switch at each station and in shunt across the reproducing equipment is a circuit for low frequency signals only comprising a capacitor 16 connected in series with an electro-magnetic escapement mechanism 17 and a low-pass filter 18. In a two wire circuit, the filter 18 may comprise radio frequency chokes in the two wires. The feeders 13 carry the requisite programme signals and, for a television system, they would carry the necessary sound and vision signals. The sound signals in a television relay system may be distributed at audio frequency. The video signals might be distributed over short distances at video frequency but more commonly would be superimposed on a carrier. Such arrangements are well known in the art and will not be further described. Commonly there would be several feeders distributing different programmes so that each subscriber can select the required programme by operation of a seelctor switch connecting the appropriate distribution feeder to his reproducing equipment. The audio input signals at terminals 19 are fed through an audio frequency transformer 20 and combined in a radio frequency transformer 21 with video signals on a suitable carrier from input terminals 22. The present invention is concerned more particularly with the payment in a subscription system in which the user pays for each programme seen at a rate predetermined for the particular programme but which may differ for different programmes. Programmes requiring payment may be sent on only one or only some of the distribution feeders. The escapement mechanism 17 at each subscriber's station is associated with a differential gear 23 (FIGURE 2) having one input shaft actuation by a coin box unit 24 so that it is turned by an amount dependent on the coins fed into the coin box, whilst the other input shaft is driven by low frequency pulses from the central station driven by the escapement mechanism 17 through a gear box 25. The output from the differential gear actuates the aforementioned switch 15; the arrangement being such that, when coins have been put in the coin box 24, the switch 15 will be closed until such time as the electro-magnetic escapement mechanism 17 has effected such rotation of one input of the differential gear 23 as will open the switch 15. The escapement mechanism 17 is actuated by the charging and discharging current of the capacitor 16 due to pulses sent out from the central station 10. These pulses, which are at a frequency below the audio frequency band and typically have a duration of between 1 and 50 seconds, are produced by cyclic operation of a switch 26 at the central station, this switch being illustrated diagrammatically as either connecting the feeders 13 to a source of direct potential indicated at 27 or connecting the feeders 13 through a discharging circuit which includes a current integrating meter 28. A low-pass filter 29 is provided in the input circuit from the switch to the feeder system to prevent the pulse generating system affecting the audio and/or television signals. When the switch 26 is in the charging position, the capacitors 16 at all the subscriber stations who are using the programme will be charged to the voltage of the source 27. When the switch is in the other position the capacitors will be discharged through the integrating meter 28. The feeder system will have a leakage and this may be represented effectively by a shunt resistance indicated at 30. FIGURE 3 is a graph showing the charge and discharge currents. The charge current shown during the period from 0 to $t_1$ never drops to zero because of the constant leakage current and hence if the charge current was measured, in order to determine the current passing into the subscribers' capacitors, it would be necessary to know the leakage. The leakage however is not constant and it is preferred therefore to measure the discharge current. When the switch 26 is in the discharge position the leakage resistance 30 is short-circuited by the discharge path through the integrating meter and, to a first approximation, the magnitude of the leakage resistance is immaterial in measuring the total charge of all the capacitors by the discharge current integrating meter 28. The capacitors 16 at the sbscribers' stations are all of the same capacity. The integrating meter indication is proportional to the charge contained in every connected capacitor and hence to the number of subscribers who have switched on to that particular programme. If each discharge pulse is measured consecutively by the integrating meter 28 then the reading of the meter 28 is proportional to the total money collected in the coin boxes of the various subscribers in respect of that programme assuming that the price of the programme is a function of the number of pulses in unit time.

The capacitors 16 at the subscriber's stations may readily be made of sufficient magnitude that any shunt capacitance of the feeder network is negligible. This shunt capacitance may moreover readily be checked by measuring the discharge current from pulses at a time when no subscribers would be taking programmes.

Figure 4:
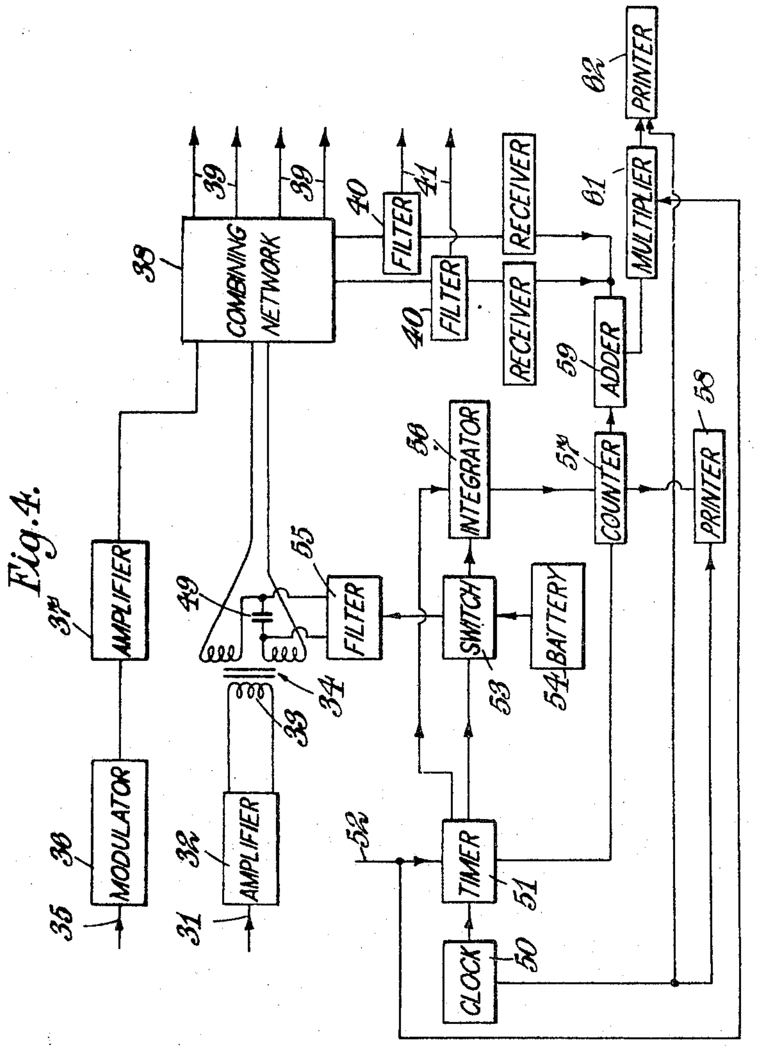
FIGURE 4 is a block diagram illustrating apparatus at a central distributing station.

FIGURE 4 is a block diagram of a main distribution centre for originating signals to the subscribers and for controlling the cost rate of the various programmes and for recording the extent of use and cash collected by the system. This central station serves subscribers connected directly to it on local networks and also transmits signals over point-to-point links to further distribution centres referred to as sub-stations. In FIGURE 4 there is shown the apparatus for one programme only. In this particular arrangement audio signals are distributed at audio frequencies and they are fed by an input circuit 31 into an audio frequency power amplifier 32 and thence to the primary winding 33 of an audio output transformer 34 for matching the output to the outgoing feeders. The video signals on an input lead 35 are fed into a modulator 36 to be applied as a modulation to a carrier of suitable frequency and the modulated carrier is amplified by a carrier frequency amplifier 37 and is thence fed into a combining network 38 where the amplified modulated carrier carrying the vision signals is combined with the audio signals from the transformer 34. From this combining network the signals are fed out on subscribers' feeders indicated at 39 and also through filters 40 to point-to-point links 41 leading to the aforementioned sub-stations.

The equipment of FIGURE 4 thus far described would have to be provided for each programme channel, whether that channel carries individually charged programmes or not. For each channel that carries programmes to be charged individually, further apparatus now to be described is provided. A clock 50 transmits timing pulses to a timer 51 which is controlled by a rate-per-hour, i.e., price rating, input 52 to produce control pulses for a switch 53 which applies accurately regulated voltage pulses to the distribution network from a stable battery supply 54 through a low-pass filter 55 and a by-pass capacitor 49 to the split secondary winding of the aforementioned audio output transformer 34. The pulses are then fed out through the combining network 38 to the subscribers' feeders 39 and to the point-to-point links. These pulses charge the capacitors at the subscribers' stations and discharge pulses come back having a discharge current magnitude dependent on the capacitance of the various subscribers stations switched to select and utilising that programme and also from any self capacitance of the network. As will be explained later the outgoing pulses are at a sub-audio frequency and the returning discharge pulses pass through the low-pass filter 55 and switch 53 to a current integrator and meter 56. The output of the integrator 56 is converted to digital form by a counter 57 which makes a digital count at a constant rate initiated by the timer 51. In the integrator 56, pulses from the timer 51 are applied as current pulses of controlled magnitude to discharge the integrator and the counter 57 count the number of pulses for this purpose, the counter being re-set by a pulse from the timer 51 after each cycle. The output of the counter 57 is recorded by a printing device 58 which also records the date and the time from the clock 50. The printing device 58 thus records the extent of use of each programme by the local subscribers directly connected to the central station by the feeders 39. The output from the counter 57 is also fed to an adder 59 together with signals from telemeter receivers 60. These telemeter receivers receive signals from the point-to-point links 41 via the filters 40 which ensure that only the required telemetered information signals pass to the receivers 60.

The system is arranged to use time division multiplex for combining the information in digital form from each sub-centre or other distribution point. For this purpose the digital output of the counter 57 is fed to the adder 59 successively with the digital outputs from the telemeter receivers 60. The combined output from the adder 59 is fed to a multiplier 61 where the total is multiplied by the rate-per-hour factor from input 52 and to give the total sum of money collected which total is fed to a print-out device 62 together with date and time information from the clock 50.

A sub-station is illustrated in FIGURE 5 and has an input over the aforementioned point-to-point link 41 consisting of audio power signals, vision signals modulated on a carrier and the pulses from the switch 53. These input signals are fed to a filter 70 which separates the vision signals and passes the vision carrier to a vision amplifier 71 and thence to a combining network 71 for re-combining with audio signals and pulse signals and feeding to subscriber feeders 73. The sub-station in FIGURE 5 is also shown as feeding signals out to a further point-to-point link 74. The audio signals and the current pulses from the filter 70 are fed to an audio frequency transformer 75 which has split balanced primary and secondary windings. The audio output from the secondary windings is fed to the combining network 72 whilst the charge current pulses are extracted from the primary winding and passed to a delay timer circuit 76 which delays the pulses, as will be more fully explained later, for a period such that the various distribution centres send out pulses in sequence and thus provide digital counts representative of the corresponding discharge currents in sequence. From the delay timer circuit 76 the delayed pulses are fed to a switch 77 for switching a stable battery 78 to provide direct voltage pulses of known amplitude in a manner similar to that employed in the central station. These pulses are fed into the secondary winding of the transformer 75 and thence to the combining network 72 and so to the distribution feeders 73 and point-to-point link 74. As at the central station, the discharge current is measured by an integrator 79 and the output converted to digital form by a counter 80, the delay timer 76 at the sub-station providing the necessary timing pulses which were provided by the clock 50 at the central station. The output from the counter 80 is printed by a print-out device 81 which also prints the date and time information obtained from the delay timer 76. The output from the counter 80 also goes to a telemeter modulator 82 and telemeter signal amplifier 83 to provide information for feeding back to the central station over the point-to-point link 41. The modulator 82 at the sub-station and the receiver 60 at the central station may be arranged in any convenient manner to transmit and receive the digital count information without interfering with the reverse direction signal transmission over the point-to-point link. Similar telemetered signals will come to the sub-station over the point-to-point link 74 and are separated by a filter 84 before being fed into the amplifier 83. Because of the time multiplexing these signals will be at different times from the locally counted digital information to be transmitted to the central station.

Figure 6:
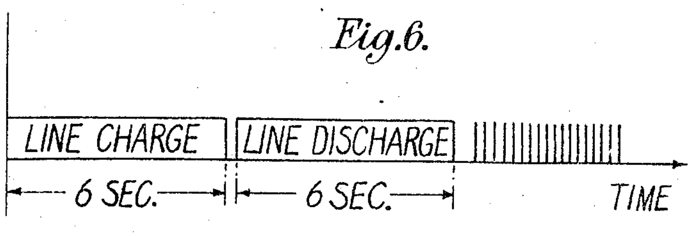
FIGURES 6 and 7 are graphical diagrams illustrating pulses employed in the system.

The pulses emitted by the timer 51 at the central station and by the delay timer 76 consist of an interrogation cycle as shown in FIGURE 6, the distribution feeder network firstly being charged for six seconds in a typical case, with the counting instrument held mechanically at zero. Six seconds in a typical case allows sufficient time for the network to be charged to nearly the full battery voltage. The switch 53 or 77 then discharges the network through the current integrator for six seconds. The integrator is, in this particular embodiment, an integrating meter instrument which will give maximum deflection at the end of the discharge perior. After an interval of about $\frac{1}{10}$ of a second, the integrator 56 or 79 is then connected to a circuit from the timer which passes a number of equally controlled current pulses in the reverse direction to discharge the meter; these pulses conveniently are at a rate of 1 kc./s. and continue until the meter returns to zero whereupon they are automatically stopped. The interrogation cycle takes approximately 15 to 20 seconds.

In a total time of five minutes something like ten individual interrogation cycles can be completed (to allow for the delay in tandem connected sub-stations), and then a further set of pulses is emitted of much shorter duration which, although not fully charging the network is sufficient to operate the escapement of all the subscribers' meters. The interrogation pulse plus the additional price pulses control the rate of the subscribers meter. The interrogation pulse alone is used to determine the number of subscribers connected at any one time. A maximum of fifty-nine price pulses is provided for in each timing cycle. These price pulses with the interrogation pulse enable the price rate of programme to be varied over a range of sixty to one. The price pulses would be controlled from the price rate control 52 at the central station.

Figure 7:
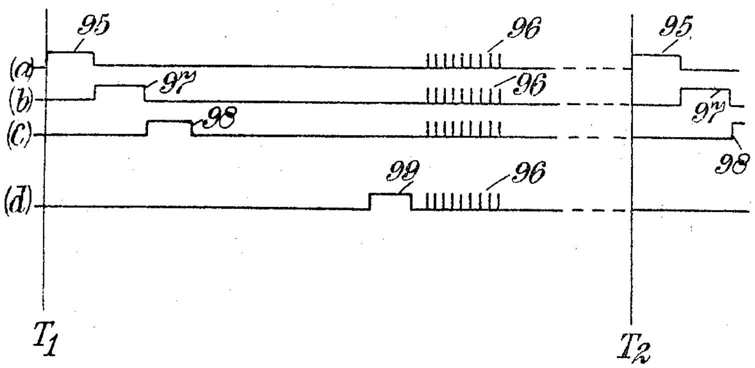

The complete sequence of operations is shown in FIGURE 7 which is a graphical diagram illustrating the timing of operations at the various stations. The time axes of the diagrams are horizontal and the period between the lines $T_1$ and $T_2$ is one complete interrogation and price setting cycle, typically a 5-minute period. In line *a*, the central station has an individual interrogation cycle as shown at 95 which cycle would last typically for 15 seconds and would contain the various operations discussed with reference to FIGURE 6. At some later time the price control pulses 96 would be sent out, time being provided for sending out up to fifty-nine such pulses and the cycle is then repeated. Lines *b*, *c* and *d* show the cycles for different sub-stations and it will be seen that the individual interrogation periods 97, 98, 99 occur at different times so that the resulting information about the use of a programme is fed back to the central station sequentially. As mentioned above, typically time might be available for ten sequential interrogation cycles providing thereby for ten separate distribution centres associated with one central station.

I claim:

1. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received.

2. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operated by the capacitor charging current.

3. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the number of pulses received.

4. A system for distributing electrical signals over wires from a central station to a plurality of users, any or all of which users may utilise the signals as desired, wherein means are provided for producing pulses which are fed over said wires to the users, the pulses having a duration of between one and fifty seconds and a waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received.

5. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received, the capacitor being connected in series with an electro-magnetic escapement mechanism energised by the charging and discharging current of the capacitor.

6. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received, wherein means are provided at the central station for integrating the current taken by the system for charging or discharging the capacitors in the users' equipment.

7. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received, the capacitors of all the users being of equal magnitude, and wherein means are provided at the central station for integrating the current taken by the system for charging or discharging the capacitors in the users' equipment.

8. A system for distributing electrical signals over wires from a central station to a plurality of users, any or all of which users may utilise the signals as desired, wherein means are provided for producing pulses of constant amplitude which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received wherein means are provided at the central station for integrating the current taken by the system for charging or discharging the capacitors in the users' equipment.

9. A system for distributing electrical signals over wires from a central station to a plurality of users, any or all of which users may utilise the signals as desired, wherein means are provided for producing pulses which are fed over said wires to the users, the pulses having a duration and wavefrom such that the required bandwith for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received and wherein a current integrating meter is provided at the central station for integrating the discharge current of the capacitors in the users' equipment.

10. A system for distributing electrical signals over wires from a central station to a plurality of users, any or all of which users may utilise the signals as desired, wherein means are provided for producing pulses which are fed over said wires to the users, the pulses having a duration and waveform such that the required bandwidth for their transmission is below the lowest frequency for the other signals to be distributed and wherein each user has metering means which are connected to the signal distribution circuit when said signals are being utilised, which metering means include a capacitor arranged to be charged by said pulses and means operatively responsive to the pulses received, and wherein a current integrating meter is provided at the central station for integrating the discharge current of the capacitors in the users' equipment, the current integrating meter being of the recording type with a timing device so that the utilisation of various different programmes may be determined subsequently.

11. A system for distributing television signals over wires to subscribers wherein the subscribers have payment or credit meters, wherein the price charged per unit time of a programme may be varied and wherein price control signals controlling the price per unit time to be charged by subscribers' meters are transmitted as a succession of pulses over said wires at a frequency below the lowest frequency used for the distributed television signals and wherein said subscribers each have metering apparatus responsive to the number of said pulses received.

12. A system for distributing television signals over wires to subscribers wherein the subscribers have payment or credit meters, wherein the price charged per unit time of a programme may be varied and wherein direct current price control pulses of a duration between one and fifty seconds controlling the price per unit time to be charged by subscribers' meters are transmitted over said wires at a frequency below the lowest frequency used for the distributed television signals and wherein said subscribers each have means driving said meters in accordance with the number of said pulses received.

13. A system for distributing television signals over wires to subscribers wherein each subscribers has a capacitor which is connected in shunt across the wires when the subscriber is utilising input signals on the wires and wherein means are provided at a central station for superimposing pulses of controlled amplitude on the system to charge said capacitors and wherein, at the central station, means are provided for measuring the total discharge current of the capacitors.

14. A system for distributing electrical signals over wires as claimed in claim 1 wherein said means operatively responsive to the pulses received comprises a recording instrument arranged to record the number of such pulses.

15. A system for distributing electrical signals over wires as claimed in claim 1 wherein said means operatively responsive to the pulses received comprises a pre-payment charging instrument.

References Cited

UNITED STATES PATENTS

| | | | |
|---|---|---|---|
| 2,558,754 | 7/1951 | Horn | 325—31 |
| 3,034,707 | 5/1962 | Jefferson | 325—31 |
| 3,119,558 | 1/1964 | Kinross | 325—31 |

JOHN W. CALDWELL, *Primary Examiner.*

DAVID G. REDINBAUGH, *Examiner.*

H. W. BRITTON, *Assistant Examiner.*